Inventor
Harry Victor Moss

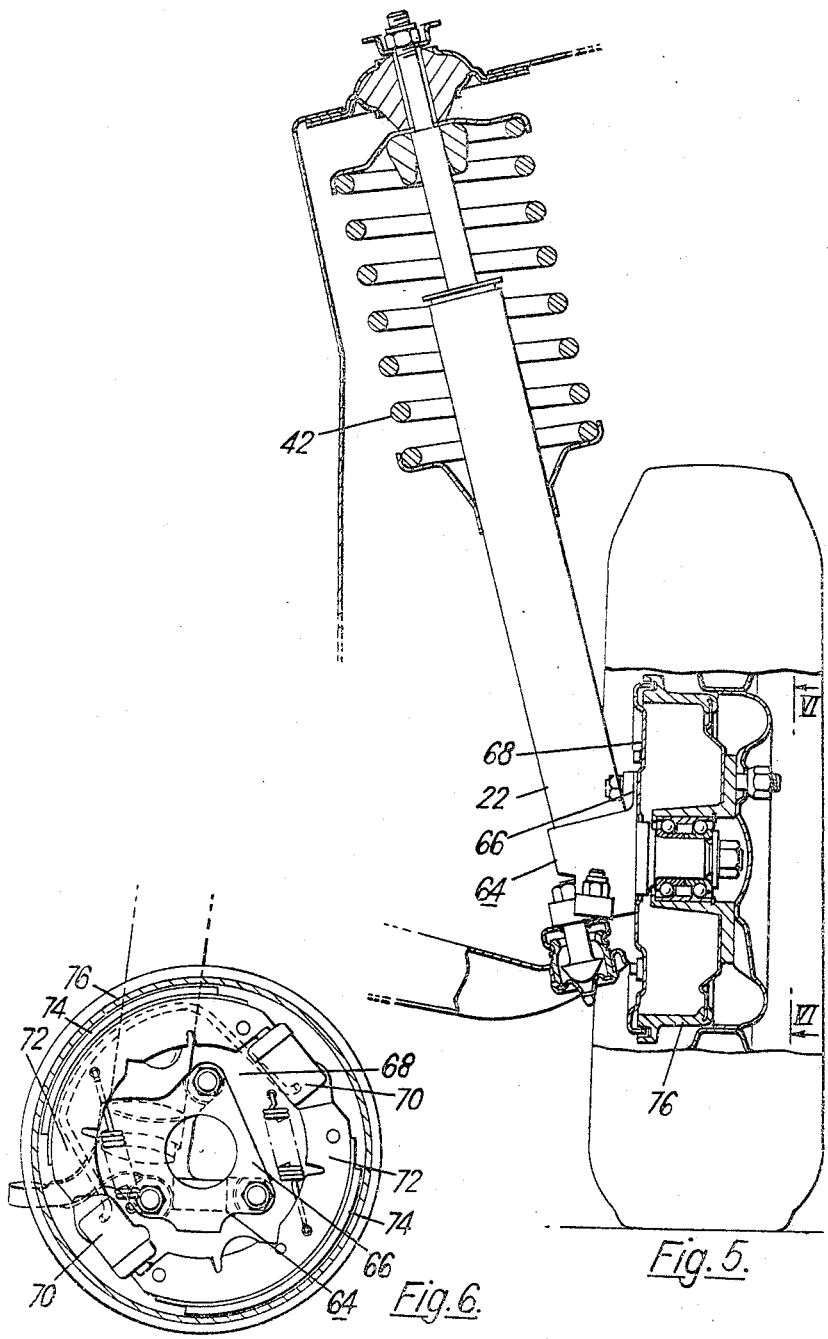

United States Patent Office 3,490,785
Patented Jan. 20, 1970

3,490,785
INDEPENDENT WHEEL SUSPENSION ASSEMBLIES FOR MOTOR VEHICLES
Harry Victor Moss, Luton, England, assignor to General Motors Corporation, Detroit, Mich., a corporation of Delaware
Filed Feb. 1, 1968, Ser. No. 702,332
Claims priority, application Great Britain, Feb. 7, 1967, 5,913/67
Int. Cl. B60g 3/06, 13/08
U.S. Cl. 280—96.2           9 Claims

ABSTRACT OF THE DISCLOSURE

In an independent wheel suspension assembly for a motor vehicle, wheel carriers for a pair of steerable wheels are controlled as to their position, in both the transverse and longitudinal directions of the vehicle, by means of pivotal links and also telescopic suspension struts. As seen in side elevation, the suspension struts are included, with their lower end portions disposed forwardly of the wheel centres; also as seen in side elevation, the axis of a helical compression spring which resiliently interconnects the relatively telescopic portions of each strut extends obliquely to the longitudinal axis of the strut. The wheel carriers each form part of an integrally constructed hub assembly which also includes a brake mounting flange (for either a disc brake or a drum brake), a mounting boss for the lower end portion of the respective strut, and a mounting boss for a steering arm and steering ball joint.

---

This invention relates to independent wheel suspension assemblies for motor vehicles.

According to the invention, from one aspect, a pair of wheel carriers for a transverse pair of steerable wheels of a motor vehicle are connected to a frame or body portion of the vehicle by means of pivotal links for controlling the position of the wheel carriers in both the transverse and longitudinal directions of the vehicle, and also by means of respective telescopic suspension struts arranged in an inclined position relatively to a vertical transverse plane of the vehicle with the lower end portions of the struts disposed forwardly of a vertical transverse plane through the wheel centres of the steerable wheels, the telescopic suspension struts comprising relatively telescopic portions whose longitudinal axes are in a transverse plane extending obliquely to a transverse plane common to the longitudinal axes of a pair of helical compression springs which resiliently interconnect the relatively telescopic portions of the respective struts.

The said frame or body portion of the vehicle thus forms the sprung portion of the vehicle.

The wheel carriers may form mountings for respective brake calipers for a pair of disc brakes: the disposition of the lower end portions of the struts generally forwardly of the respective wheel centres makes it possible, for example, for the centre lines of the brake calipers to be at a sufficiently high angle above the horizontal to give clearance between the brake calipers and the transverse pivotal links even in a full-look position of the steerable wheels. The wheel carriers may alternatively form mounting for respective brake drums for a pair of drum brakes.

The oblique disposition of the helical springs relatively to the telescopic portions of the respective struts can compensate for radial forces which would otherwise give an undesired increase in frictional resistance in the struts, notably a resistance to relative rotary movement of the telescopic portions of the struts during steering movements.

The longitudinal axes of the helical springs preferably are disposed substantially in a vertical transverse plane of the vehicle.

When the steerable wheels are in a straight-ahead position, the longitudinal axes of the respective struts and the associated helical springs are preferably disposed in respective common longitudinal planes of the vehicle.

Each of the wheel carriers for the steerable wheels may form part of an integrally constructed hub assembly which also includes a brake mounting flange, a mounting boss for the lower end portion of the respective strut, and a mounting boss for a steering arm and steering ball joint. The integrally constructed hub assembly, which may for example be a forging or a casting, may additionally include a mounting boss for a suspension ball joint forming a pivotal connection for the outboard end of the respective transverse pivotal link. The integral construction is practicable because the forward disposition of the lower end portion of each strut allows the strut mounting boss to be relatively close to the steering arm boss.

According to the invention, from another aspect, a pair of wheel carriers for a transverse pair of steerable wheels of a motor vehicle are connected to a frame or body portion of the vehicle by means of pivotal links for controlling the position of the wheel carriers in both the transverse and longitudinal directions of the vehicle, and also by means of respective telescopic suspension struts arranged in an inclined position relatively to a vertical transverse plane of the vehicle with the lower end portions of the struts disposed forwardly of a vertical transverse plane through the wheel centres of the steerable wheels, each of the wheel carriers forming part of an integrally constructed hub assembly which also includes a brake mounting flange, a mounting boss for the lower end portion of the respective strut, and a mounting boss for a steering arm and steering ball joint, and possibly additionally includes a mounting boss for a suspension ball joint forming a pivotal connection for the outboard end of the respective transverse pivotal link.

The appended claims define the scope of the invention claimed. The invention and how it can be performed are hereinafter particularly described with reference to the accompanying drawings, in which:

FIG. 5 is a fragmentary cross-section somewhat similar to FIG. 1, but of a second embodiment of an independent wheel suspension assembly according to the invention, this embodiment being for motor vehicle front wheels equipped with drum brakes; and FIG. 6 is a fragmentary elevation, with a number of parts omitted for clarity, on the line VI—VI of FIG. 5, in the direction of the arrows.

Figure 1:
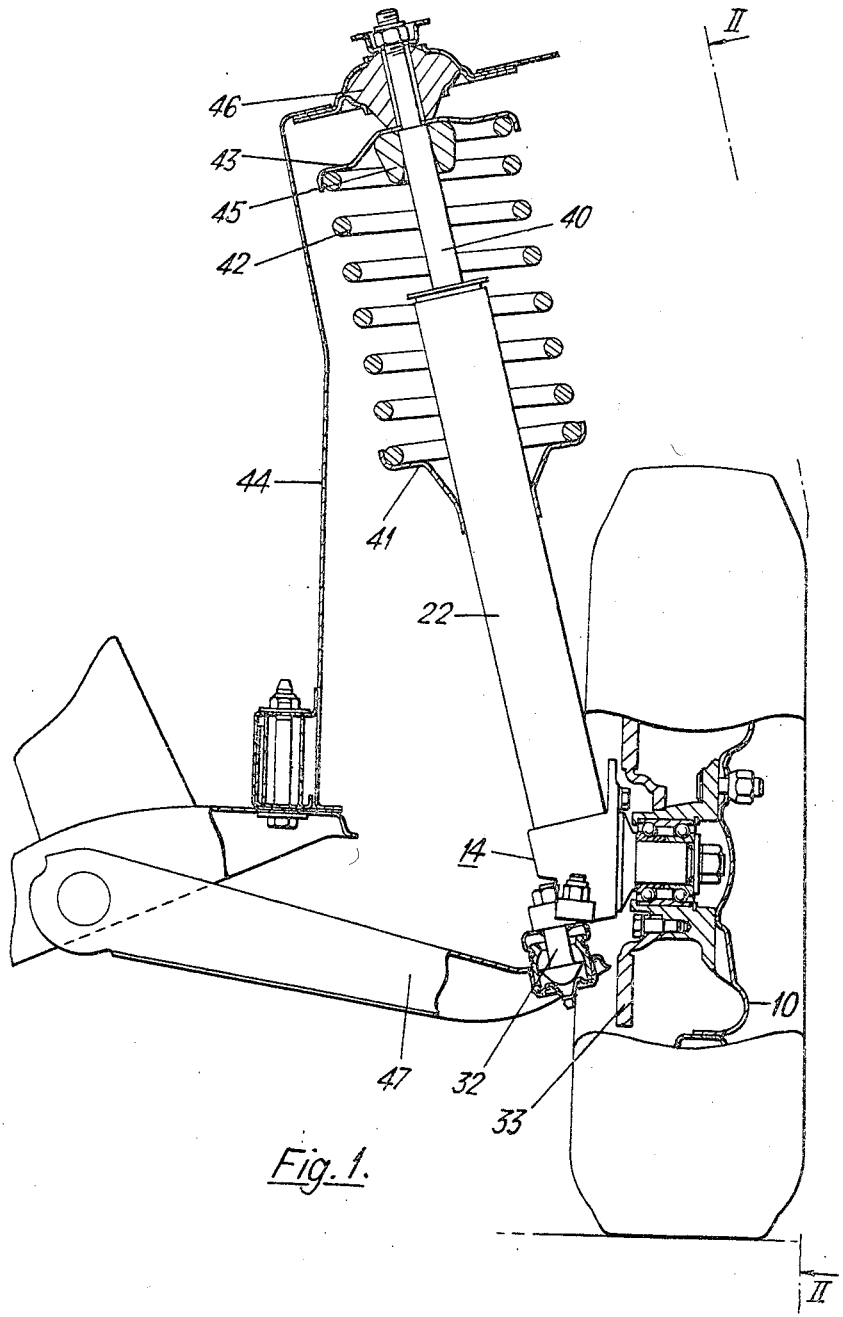
FIG. 1 is a fragmentary cross-section, with some parts in elevation, of a first embodiment of an independent wheel suspension assembly according to the invention, specifically for a transverse pair of motor vehicle front wheels equipped with disc brakes.

In the drawings, only one wheel, with its associated parts, is shown: the other wheel of the transverse pair, with its associated parts, is similar, and will not be further described.

Figure 2:
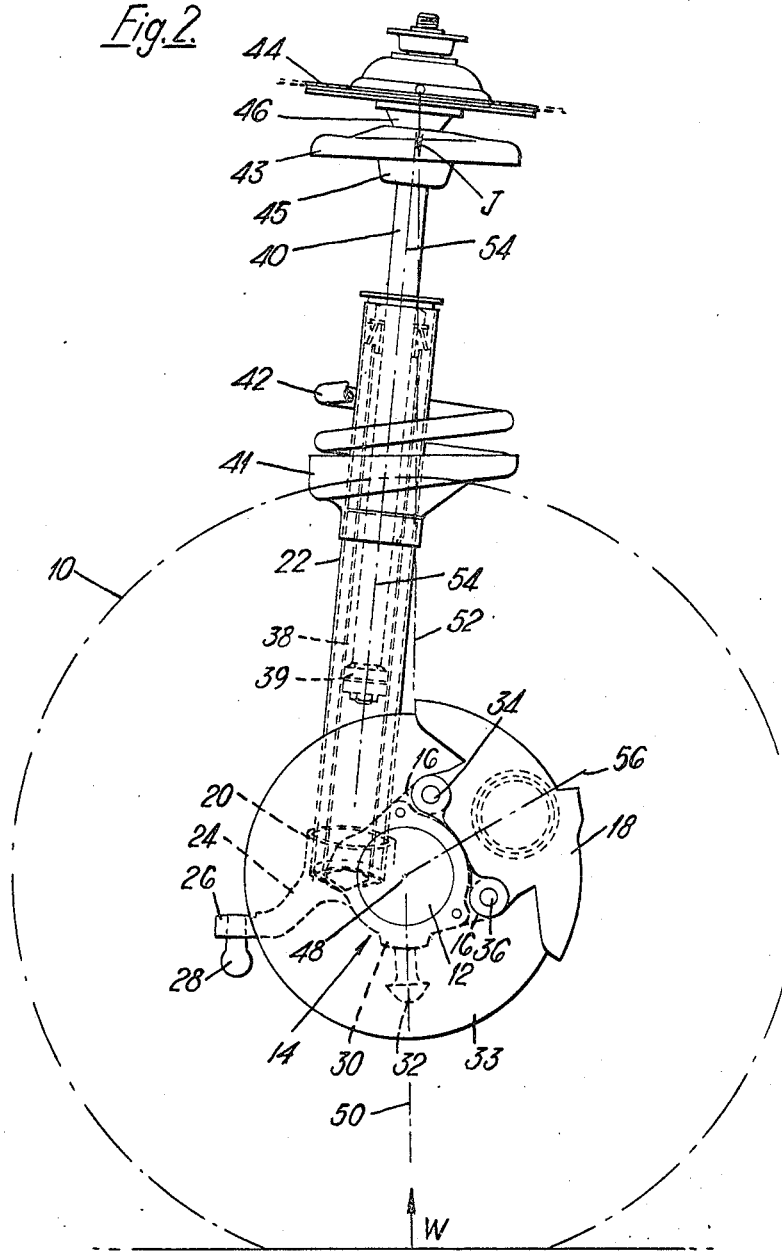
FIG. 2 is a fragmentary elevation, with some parts in section or cut away, on the line II—II of FIG. 1, in the direction of the arrows.

In the view of the suspension assembly according to the invention shown in FIG. 2 of the drawings, the direction of forward vehicle travel is to the left. As is best seen in FIG. 2, a steerable front wheel 10 of the vehicle is rotatably mounted on a wheel carrier 12 forming part of an integrally constructed forged hub assembly 14 which also includes a mounting flange 16 for a disc brake caliper 18, a mounting boss 20 for a lower end portion of a telescopic suspension strut 22, a mounting boss 24 for a forwardly extending steering arm 26 the free end of which carries a steering ball joint 28, and a mounting boss 30 for a suspension ball joint 32.

The brake caliper 18 co-operates with a brake disc 33 rotatable with the wheel 10, and is mounted on the caliper mounting flange 16 by means of a pair of mounting bosses 34 and 36.

The telescopic suspension strut 22 includes a pair of relatively telescopic portions, namely a cylinder 38 and a piston 39 carried by a piston rod 40 which projects from the cylinder. The cylinder is capable of rotary movement relatively to the piston rod, to allow steering movement of the front wheels.

The strut also includes a helical compression spring 42 which surrounds adjacent parts of the cylinder and piston rod and resiliently interconnects these two relatively telescopic portions, the axis of the helical spring 42 being disposed substantially in a vertical transverse plane of the vehicle. The lower end of the helical spring 42 is seated on a bracket 41 fixed to the cylinder 22, and the upper end of the helical spring is seated on an annular bracket plate 43 which is mounted on the piston rod 40 between an annular resilient bushing 45 shaped as a bump stop for the cylinder, and an elastomeric bearing bush 46 by means of which the upper end portion of the piston rod is pivotally and rotatably mounted on a portion of the vehicle body 44.

Figure 3:
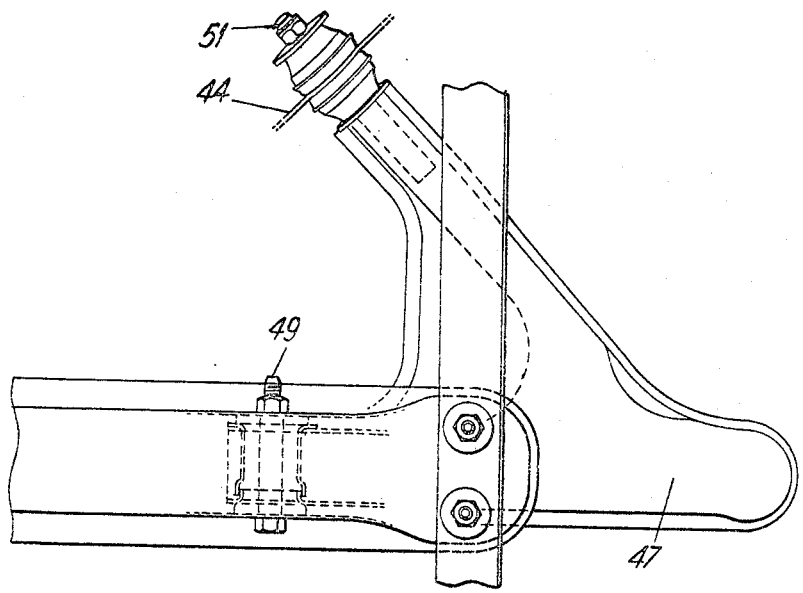
FIG. 3 is a fragmentary plan showing details of a wheel suspension arm forming part of the assembly shown in FIG. 1.

The steering axis for the wheel 10 passes through the centres of the bearing bush 46 and of the suspension ball joint 32 which projects downwardly from the integral hub assembly 14. As is shown in FIGS. 1 and 3, a transversely extending pivotal link 47 has at its outboard end a socket for the suspension ball joint 32, the suspension ball joint 32 thus forming a pivotal connection between the pivotal link 47 and the integral hub assembly 14. The pivotal link 47 is of wishbone configuration, and at its inboard end has a first arm pivotally connected to a cross-member of the vehicle body 44 by means of a rubber-bushed pin joint 49 the pivot axis of which extends longitudinally of the vehicle, this first arm thereby acting as a pivotal connection between the wheel carrier 12 and the vehicle body 44 for controlling location of the wheel carrier transversely of the vehicle during rise and fall of the front wheel 10. At the inboard end of the pivotal link 47 there is also a second, obliquely extending arm pivotally connected to the vehicle body 44 by means of a rubber-bushed stud connection 51, this second arm forming a pivotal link for controlling location of the wheel carrier 12 longitudinally of the vehicle during rise and fall of the front wheel 10.

The telescopic suspension strut 22 is disposed in an inclined position relatively to a vertical transverse plane of the vehicle, with the lower end portion of the cylinder 38 of the strut disposed generally forwardly of the wheel centre 48 of the wheel 10. More specifically, the lower end portions of the telescopic suspension struts for the two front wheels are disposed forwardly of a vertical plane 50 through the wheel centres of these wheels, and (in this embodiment) are disposed slightly higher than the wheel centres.

The helical compression spring 42 which resiliently interconnects the two relatively telescopic portions 38 and 40 of the suspension strut 22 is not mounted coaxially with respect to these portions, but is mounted with its longitudinal axis 52 extending substantially in a vertical transverse plane of the vehicle, as already indicated, and hence obliquely to the common axis 54 of the telescopic portions as viewed from the side of the vehicle, that is, as shown in FIG. 2. More specifically, the longitudinal axes 54 of the telescopic portions of the two struts are in a transverse plane which extends obliquely to a transverse plane common to the longitudinal axes 52 of the two helical compression springs. However, the longitudinal axes of the springs and the associated telescopic portions are in respective common longitudinal planes of the vehicle, specifically a longitudinal plane which converges upwardly towards the central longitudinal vertical plane of the vehicle.

The inclined position of the two telescopic suspension struts, with their lower end portions generally forwardly of the wheel centres, allows the brake calipers to be arranged, as shown in the drawing, with their centre line 56 at a fairly high angle above the horizontal, to ensure that, even in a full-lock position of the steerable wheels, there is clearance between the brake calipers and the transverse pivotal links.

If the helical spring of each suspension strut were mounted coaxially of the strut, the springs would be in an inclined position which would produce radial reaction forces at the bearing bushes 46 forming the pivot mountings for the upper end portions of the struts, and consequently produce radial loads within the struts, so giving an undesired increase in frictional resistance at the bearings between the cylinder and piston rod which would result in heavy steering, and inferior ride of the vehicle. The oblique disposition of each spring 42 as viewed in the drawing reduces the radial reaction component: as is illustrated by the vector diagram in FIG. 4, the vertically upward reaction W to vertical wheel load and the substantially vertically downward spring force J produce only a very small resultant force R in a horizontal direction, and hence only a very small bowing action at the central portion of the strut.

Figure 4:
FIG. 4 is a force vector diagram relating to FIG. 2.

In FIG. 4, the resultant force R and the inclination of the spring axis 52 are exaggerated, for explanatory purposes: in practice, the resultant force R could be reduced to zero by arranging for the spring axis 52 to coincide with the vertical axis 50 of the wheel reaction W, with slight modification of the geometry of the illustrated assembly to produce the desired caster angle, namely the correct inclination of the steering axis through the centres of the bearing bush 46 and the suspension ball joint 32.

The second embodiment of the independent wheel suspension assembly according to the invention, which is shown in FIGS. 5 and 6, is very similar to the first embodiment, shown in FIGS. 1 to 4. In this second embodiment, the inclination of each of the telescopic suspension struts 22 with respect to the vertical, and the relation between the longitudinal axes of the struts and the longitudinal axes of the helical compression springs 42, is the same as in the first embodiment. However, the integrally constructed hub assembly at the lower end of each strut is in this second embodiment denoted by the reference numeral 64, and includes a slightly modified mounting flange 66 for a drum brake backing plate 68 which in this embodiment replaces the disc brake caliper of the first embodiment. FIG. 6 shows that the other parts of the drum brake in this second embodiment are conventional, there being a pair of wheel brake cylinders 70 for expanding a pair of brake shoes 72 to bring brake linings 74 thereon into frictional engagement with a rotary brake drum 76.

I claim:

1. An independent wheel suspension assembly for a motor vehicle, in which a pair of wheel carriers for a transverse pair of steerable wheels of a motor vehicle are connected to a sprung portion of the vehicle by means of pivotal links for controlling the position of the wheel carriers in both the transverse and longitudinal directions of the vehicle, and also by means of respective telescopic suspension struts arranged in an inclined position relatively to a vertical transverse plane of the vehicle with the lower end portions of the struts disposed forwardly of a vertical transverse plane through the wheel centres of the steerable wheels, the telescopic suspension struts comprising relatively telescopic portions whose longitudinal axes are in a transverse plane extending obliquely to a transverse plane common to the longitudinal axes of a pair of helical compression springs which resiliently interconnect the relatively telescopic portions of the respective struts.

2. An independent wheel suspension assembly according to claim 1, wherein the wheel carriers form mountings for respective brake calipers for a pair of disc brakes.

3. An independent wheel suspension assembly according to claim 1, wherein the wheel carriers form mountings for respective brake backing plates for a pair of drum brakes.

4. An independent wheel suspension assembly according to claim 1, wherein the longitudinal axes of the helical springs are disposed substantially in a vertical transverse plane of the vehicle.

5. An independent wheel suspension assembly according to claim 1, wherein, when the steerable wheels are in a straight-ahead position, the longitudinal axes of the respective struts and the associated helical springs are disposed in respective common longitudinal planes of the vehicle.

6. An independent wheel suspension assembly for a motor vehicle, in which a pair of wheel carriers for a transverse pair of steerable wheels of a motor vehicle are connected to a sprung portion of the vehicle by means of pivotal links for controlling the position of the wheel carriers in both the transverse and longitudinal directions of the vehicle, and also by means of respective telescopic suspension struts arranged in an inclined position relatively to a vertical transverse plane of the vehicle with the lower end portions of the struts disposed forwardly of a vertical transverse plane through the wheel centres of the steerable wheels, the telescopic suspension struts comprising relatively telescopic portions whose longitudinal axes are in a transverse plane extending obliquely to a transverse plane common to the longitudinal axes of a pair of helical compression springs which resiliently interconnect the relatively telescopic portions of the respective struts, and in which each of the wheel carriers for the steerable wheels forms part of an integrally constructed hub assembly which also includes a brake mounting flange, a mounting boss for the lower end portion of the respective strut, and a mounting boss for a steering arm and steering ball joint.

7. An independent wheel suspension assembly according to claim 6, wherein the integrally constructed hub assembly additionally includes a mounting boss for a suspension ball joint forming a pivotal connection for the outboard end of the respective transverse pivotal link.

8. An independent wheel suspension assembly for a motor vehicle, in which a pair of wheel carriers for a transverse pair of steerable wheels of the vehicle are connected to a sprung portion of the vehicle by means of pivotal links for controlling the position of the wheel carriers in both the transverse and longitudinal directions of the vehicle, and also by means of respective telescopic suspension struts arranged in an inclined position relatively to a vertical transverse plane of the vehicle with the lower end portions of the struts disposed forwardly of a vertical transverse plane through the wheel centres of the steerable wheels, each of the wheel carriers forming part of an integrally constructed hub assembly which also includes a brake mounting flange, a mounting boss for the lower end portion of the respective strut, and a mounting boss for a steering arm and steering ball joint.

9. An independent wheel suspension assembly according to claim 8, wherein the integrally constructed hub assembly additionally includes a mounting boss for a suspension ball joint forming a pivotal connection for the outboard end of the respective transverse pivotal link.

References Cited

UNITED STATES PATENTS

| | | | |
|---|---|---|---|
| 2,624,592 | 1/1953 | MacPherson | 280—96.2 |
| 3,183,999 | 5/1965 | Buyze et al. | 188—18 |
| 3,211,444 | 10/1965 | Avner | 280—96.2 X |
| 3,346,272 | 10/1967 | Smith | 280—96.2 |
| 3,414,287 | 12/1968 | Weiertz | 280—96.2 |

FOREIGN PATENTS

| | | |
|---|---|---|
| 1,031,650 | 6/1966 | Great Britain. |
| 1,211,951 | 3/1966 | Germany. |

KENNETH H. BETTS, Primary Examiner